United States Patent
Ozawa et al.

(10) Patent No.: US 10,700,413 B2
(45) Date of Patent: Jun. 30, 2020

(54) ANTENNA DEVICE AND ELECTRONIC APPARATUS

(71) Applicant: Murata Manufacturing Co., Ltd., Nagaokakyo-shi, Kyoto-fu (JP)

(72) Inventors: Masahiro Ozawa, Nagaokakyo (JP); Kentaro Mikawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 156 days.

(21) Appl. No.: 16/000,992

(22) Filed: Jun. 6, 2018

(65) Prior Publication Data
US 2018/0287242 A1    Oct. 4, 2018

Related U.S. Application Data

(63) Continuation of application No. PCT/JP2016/087702, filed on Dec. 19, 2016.

(30) Foreign Application Priority Data

Jan. 13, 2016  (JP) ................. 2016-004208

(51) Int. Cl.
| | |
|---|---|
| H01Q 1/24 | (2006.01) |
| H01Q 7/00 | (2006.01) |
| H01Q 5/35 | (2015.01) |
| H01Q 9/14 | (2006.01) |
| H01Q 1/36 | (2006.01) |
| H01Q 7/06 | (2006.01) |
| H04B 5/00 | (2006.01) |

(52) U.S. Cl.
CPC ............ *H01Q 1/24* (2013.01); *H01Q 1/364* (2013.01); *H01Q 5/35* (2015.01); *H01Q 7/00* (2013.01); *H01Q 7/06* (2013.01); *H01Q 9/14* (2013.01); *H01Q 1/243* (2013.01); *H04B 5/0081* (2013.01)

(58) Field of Classification Search
CPC ........... H01Q 1/24; H01Q 5/35; H01Q 1/364; H01Q 7/00; H01Q 7/06; H01Q 9/14; H01Q 1/243
See application file for complete search history.

(56) References Cited

FOREIGN PATENT DOCUMENTS

| | | |
|---|---|---|
| JP | 2012-019302 A | 1/2012 |
| JP | 2012-070529 A | 4/2012 |
| JP | 2013-090172 A | 5/2013 |
| JP | 2013-093429 A | 5/2013 |

OTHER PUBLICATIONS

Official Communication issued in International Patent Application No. PCT/JP2016/087702, dated Feb. 28, 2017.

*Primary Examiner* — Graham P Smith
(74) *Attorney, Agent, or Firm* — Keating & Bennett, LLP

(57) ABSTRACT

An electronic apparatus includes a spiral coil conductor shared by a first non-contact transfer system and a second non-contact transfer system. In the electronic apparatus, a coil antenna includes an inner coil and an outer coil connected in series with each other. The coil antenna includes opposite ends connected to a first system circuit. The inner coil includes opposite ends connected to the outer coil. The outer coil defines and functions as a booster coupled to the inner coil via an electromagnetic field.

21 Claims, 8 Drawing Sheets

ANTENNA DEVICE AND ELECTRONIC APPARATUS

CROSS REFERENCE TO RELATED APPLICATIONS

This application claims the benefit of priority to Japanese Patent Application No. 2016-004208 filed on Jan. 13, 2016 and is a Continuation Application of PCT Application No. PCT/JP2016/087702 filed on Dec. 19, 2016. The entire contents of each application are hereby incorporated herein by reference.

BACKGROUND OF THE INVENTION

1. Field of the Invention

The present invention relates to an antenna device for use in an RFID system, a near-field communication system, or other suitable system, and to an electronic apparatus including the same.

2. Description of the Related Art

Electronic apparatuses, such as cellular phone terminals incorporating an RFID system operating in the 13.56 MHz band, for example, a near-field communication (NFC) system, have increased in recent years. Electronic apparatuses incorporating a non-contact power supply system using magnetic coupling to eliminate the inconvenience of connecting cables have also increased. When two such systems are incorporated in a single electronic apparatus, one example is one in which the electronic apparatus includes respective coils for the two systems. This configuration hinders miniaturization of the electronic apparatus.

Japanese Unexamined Patent Application Publication No. 2013-90172 discloses a device in which a single coil is shared by an NFC system and a non-contact power supply system. The device in Japanese Unexamined Patent Application Publication No. 2013-90172 includes a switch at a point of the coil to cause the single coil to be used as a coil for non-contact power supply by turning on the switch.

For the device in Japanese Unexamined Patent Application Publication No. 2013-90172, however, if the size of the antenna is significantly different from that of an antenna on a target side, their coupling may be weak, depending on the location. In such a situation, the coupling between the apparatuses may be weak, and the communication may be unstable.

SUMMARY OF THE INVENTION

Preferred embodiments of the present invention provide antenna devices and electronic apparatuses in which coupling to a transfer target is improved and stable communication is achieved.

An antenna device according to a preferred embodiment of the present invention includes a coil conductor shared by a first non-contact transfer system and a second non-contact transfer system. The coil conductor includes a first coil portion and a second coil portion connected in series with each other. The coil conductor includes opposite ends connected to a circuit for the first non-contact transfer system. The first coil portion includes opposite ends connected to a circuit for the second non-contact transfer system. The second coil portion is connected to the first coil portion at least via a magnetic field.

In this configuration, by using a section of the coil conductor (second coil portion) used as an antenna for the first non-contact transfer system, as a booster antenna for the second non-contact transfer system, the coupling to a transfer target is able to be improved without having to increase the size of the apparatus. Thus, the communication is stabilized.

An antenna device according to a preferred embodiment further includes a first capacitor defining a resonance circuit together with the first coil portion, a second capacitor defining a resonance circuit together with the second coil portion, and a third capacitor defining a resonance circuit together with the first coil portion and the second coil portion.

The first coil portion may preferably be located on an inner side of the coil conductor, and the second coil portion may preferably be located on an outer side of the coil conductor.

The first coil portion and the second coil portion may preferably be connected in series with each other with a first switch interposed therebetween An antenna device according to a preferred embodiment further includes a second switch that selectively connects the first coil portion to the circuit for the first non-contact transfer system or the circuit for the second non-contact transfer system and a third switch that selectively connects the second coil portion to the circuit for the first non-contact transfer system or the second capacitor.

A carrier frequency of the first non-contact transfer system may be lower than a carrier frequency of the second non-contact transfer system.

The first non-contact transfer system may be a magnetic-field non-contact power transfer system, and the second non-contact transfer system may be a magnetic-field non-contact communication system.

An electronic apparatus according to a preferred embodiment of the present invention includes an antenna device including a coil conductor, a circuit for a first non-contact transfer system connected to the antenna device, and a circuit for a second non-contact transfer system connected to the antenna device. The coil conductor includes a first coil portion and a second coil portion connected in series with each other. The coil conductor includes opposite ends connected to a circuit for the first non-contact transfer system. The first coil portion includes opposite ends connected to a circuit for the second non-contact transfer system. The second coil portion is connected to the first coil portion at least via a magnetic field.

In this configuration, by using a section of the coil conductor (second coil portion) used as an antenna for the first non-contact transfer system, as a booster antenna for the second non-contact transfer system, the coupling to a transfer target is able to be improved without having to increase the size of the apparatus. Thus, the communication is stabilized.

According to preferred embodiments of the present invention, coupling to a transfer target is able to be improved without having to increase the size of a device (apparatus), and communication with the transfer target is able to be stabilized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
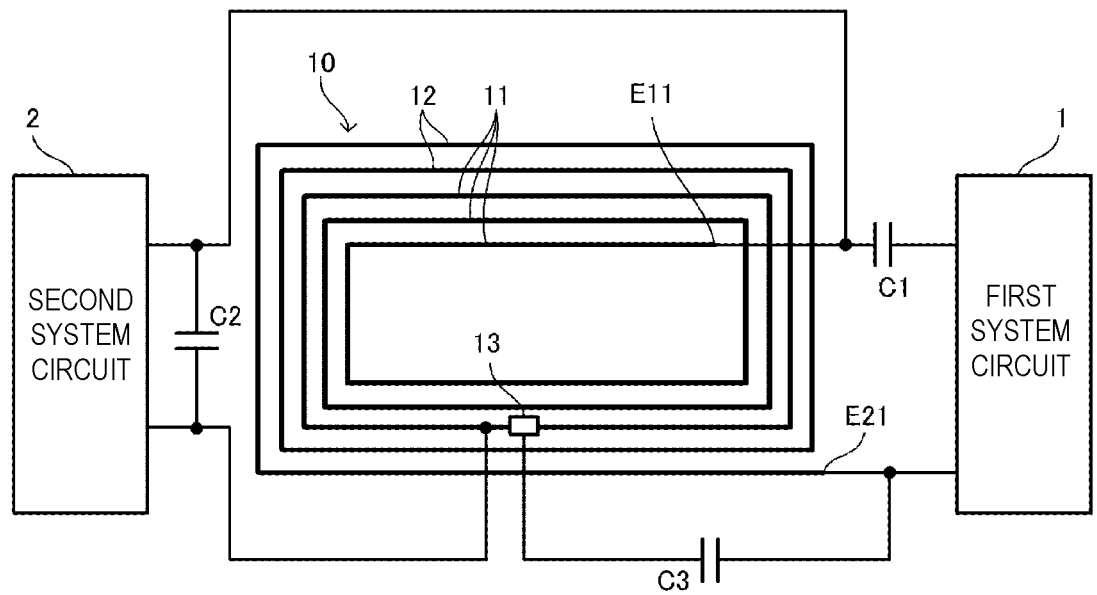
FIG. 1 illustrates a configuration of an electronic apparatus according to a first preferred embodiment of the present invention.
Figure 2:
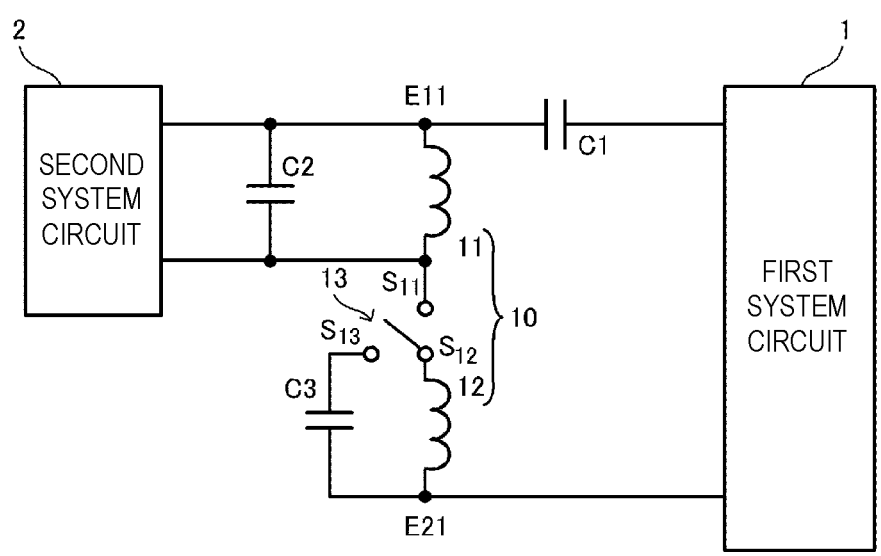
FIG. 2 illustrates an equivalent circuit of FIG. 1.

FIG. 1 illustrates a configuration of an electronic apparatus according to a first preferred embodiment. FIG. 2 illustrates an equivalent circuit of FIG. 1. Examples of the electronic apparatus may preferably include a smartphone, a tablet terminal, a notebook PC, a camera, a game machine, and a toy.

The electronic apparatus includes a coil antenna 10. The coil antenna 10 is preferably a coil conductor pattern having a rectangular or substantially rectangular spiral shape as seen in plan view, for example. The coil antenna 10 in FIG. 1 preferably has a two-dimensional configuration, i.e. single-layer spiral structure, for example. The coil antenna 10 may have a multilayer spiral structure. The coil antenna 10 includes an inner coil 11 and an outer coil 12 that are connected in series with each other with a first switch 13 interposed therebetween. The inner coil 11 is an example of the "first coil portion". The outer coil 12 is an example of the "second coil portion".

The inner coil 11 is preferably a coil conductor pattern having a rectangular or substantially rectangular spiral shape as seen in plan view, for example. An inner end E11 of the inner coil 11 corresponds to a first end of the coil antenna 10, and an outer end of the inner coil 11 is connected to the first switch 13.

The outer coil 12 is preferably a coil conductor pattern that begins at the first switch 13, is wound in the same direction as that of the inner coil 11 in an outer area with respect to the inner coil 11, and has a rectangular or substantially rectangular spiral shape as seen in plan view, for example. An outer end E21 of the outer coil 12 corresponds to a second end of the coil antenna 10.

The first end of the coil antenna 10 (inner end E11 of the inner coil 11) is connected to a first end of input and output ends of a first system circuit 1 described below with a capacitor C1 interposed therebetween. The second end of the coil antenna 10 (outer end E21 of the outer coil 12) is connected to a second end of the input and output ends of the first system circuit 1. The capacitor C1 and the coil antenna 10 (inner coil 11 and outer coil 12) define a resonance circuit. A resonant frequency of the resonance circuit is preferably about 6.78 MHz or in the range of about 110 kHz to about 205 kHz, for example. The capacitor C1 may be connected in parallel with the coil antenna 10. The capacitor C1 is an example of the "third capacitor".

The opposite ends of the inner coil 11 are connected to input and output ends of a second system circuit 2 described below. A capacitor C2 is connected between the inner coil 11 and second system circuit 2. The capacitor C2 and inner coil 11 define a resonance circuit. A resonant frequency of the resonance circuit is preferably about 13.56 MHz, for example. The capacitor C2 is an example of the "first capacitor".

The first switch 13 is preferably an SPDT switch including a first end $S_{11}$, a second end $S_{12}$, and a third end $S_{13}$, as illustrated in FIG. 2. The first switch 13 is switched by a control circuit (not illustrated) and connects the second end $S_{12}$ and the first end $S_{11}$ or third end $S_{13}$. The first end $S_{11}$ is connected to the outer end of the inner coil 11. The second end $S_{12}$ is connected to the inner end of the outer coil 12. The third end $S_{13}$ is connected to the outer end E21 of the outer coil 12 with a capacitor C3 interposed therebetween. The capacitor C3 is an example of the "second capacitor".

Figure 3:
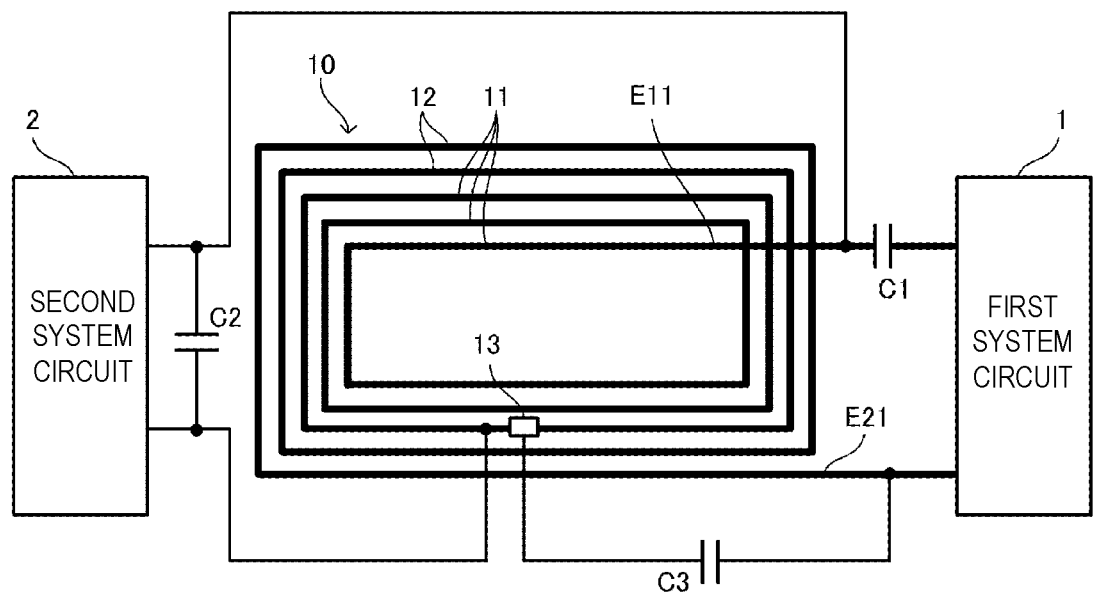
FIG. 3 includes circuit diagrams illustrating a state in which a first switch connects a first end and a second end.
Figure 3:
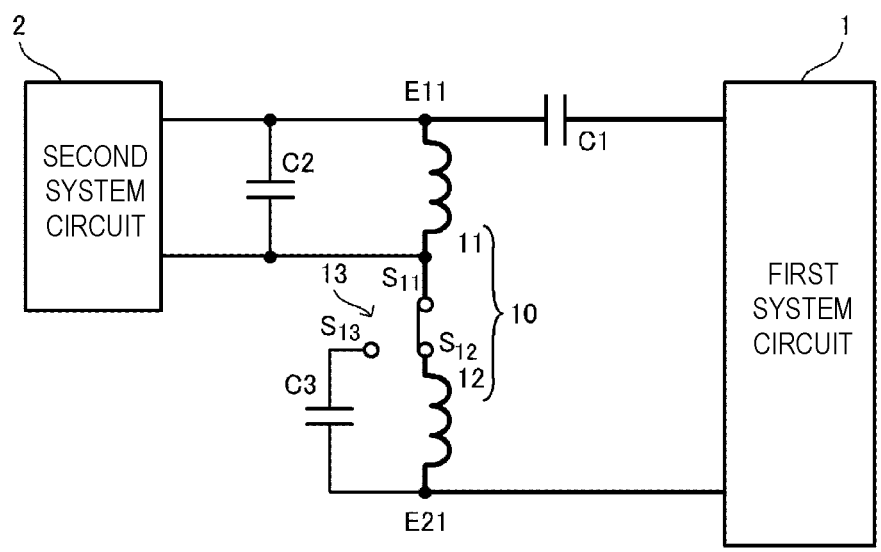

FIG. 3 includes circuit diagrams illustrating a state in which the first switch 13 connects the first end $S_{11}$ and second end $S_{12}$. In FIG. 3, the upper illustration is a plan view of the coil antenna 10, and the lower illustration is an equivalent circuit diagram. The action of the first switch 13 provides the circuit indicated by the thick lines in the upper and lower illustrations in FIG. 3.

In this case, the inner coil 11 and outer coil 12 are connected in series with each other, and the single coil antenna 10 is defined. The coil antenna 10 defines and functions as a power reception antenna or power transmission antenna used in a magnetic-field non-contact power transfer system, such as an electromagnetic induction power transfer system or a magnetic resonance power transfer system, for example. The first system circuit 1 is a power transmission circuit or a power reception circuit for the non-contact power transfer system. The first system circuit 1 is preferably defined by a semiconductor integrated circuit chip, for example.

The non-contact power transfer system is preferably used at a frequency of about 6.78 MHz or in the range of about 110 kHz to about 205 kHz, for example. The magnetic-field non-contact power transfer system transfers power by coupling to a target of the power transfer by magnetic-field coupling. This non-contact power transfer system is used to charge an electronic apparatus, such as a smartphone, for example.

The non-contact power transfer system is an example of the "first non-contact transfer system". The first system circuit 1 is an example of the "circuit for the first non-contact transfer system".

Figure 4:
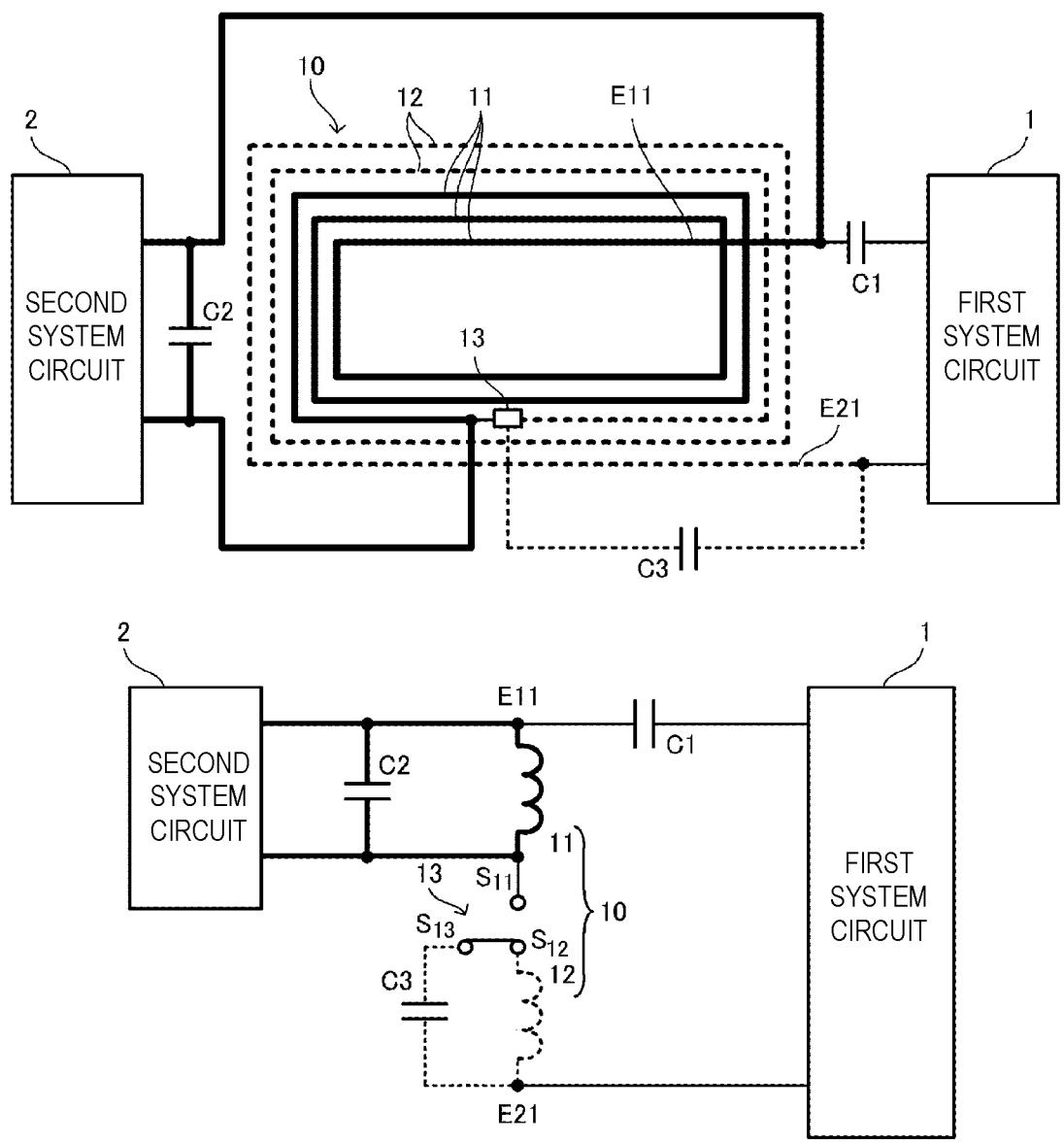
FIG. 4 includes circuit diagrams illustrating a state in which the first switch connects the second end and a third end.

FIG. 4 includes circuit diagrams illustrating a state in which the first switch 13 connects the second end $S_{12}$ and third end $S_{13}$. In FIG. 4, the upper illustration is a plan view of the coil antenna 10, and the lower one is an equivalent circuit diagram. The action of the first switch 13 defines the circuit indicated by the thick lines and the circuit indicated by the broken lines in the upper and lower illustrations in FIG. 4.

In this case, the coil antenna 10 is separated into the inner coil 11 and outer coil 12. Each of the inner coil 11 and outer coil 12 individually defines and functions as a coil antenna.

The inner coil 11 defines and functions as an antenna used in a communication system, such as a near-field communication system, for example. The second system circuit 2 is a power transmission circuit or a power reception circuit for the communication system using NFC. The second system circuit 2 is preferably defined by a semiconductor integrated circuit chip, for example. The second system circuit 2 may be defined by a single-chip IC with the first system circuit 1.

One example of the near-field communication system is a system using the NFC. The near-field communication system is used in the HF band, in particular, at a frequency of about 13.56 MHz. The near-field communication system communicates with a transfer target by magnetic-field coupling using an induction field and an induction current.

The magnetic-field non-contact communication system using NFC is an example of the "second non-contact transfer system". The second system circuit 2 is an example of the "circuit for the second non-contact transfer system".

As described above, the carrier frequency of the first non-contact transfer system (about 6.78 MHz or in the range of about 110 kHz to about 205 kHz) is lower than the carrier frequency of the second non-contact transfer system (about 13.56 MHz).

The first non-contact transfer system is a magnetic-field non-contact power transfer system. The second non-contact transfer system is a magnetic-field non-contact communication system.

The outer coil 12 defines a resonance circuit together with the capacitor C3. The resonant frequency of this resonance circuit is about 13.56 MHz. The outer coil 12 is magnetic-field coupled or electromagnetic-field coupled (at least magnetic-field coupled) to the inner coil 11, which is used as an antenna in a communication system, and defines and functions as a resonance booster antenna.

As described above, the electronic apparatus according to a preferred embodiment of the present preferred embodiment is able to conduct a magnetic-field non-contact power transfer by connecting the inner coil 11 and outer coil 12 in series with each other. The electronic apparatus is also able to perform communication based on magnetic-field coupling by separating the coil antenna 10 into the inner coil 11 and outer coil 12. For the magnetic-field coupling communication, if the coupling between the inner coil 11 and its transfer target is weak, the communication sensitivity is able to be improved by causing the outer coil 12 to act as a resonance booster antenna. Accordingly, the communication is able to be stabilized.

In addition, for the magnetic-field coupling communication, when the resonance circuit of the inner coil 11 and the capacitor C2 (resonance circuit 1) and the resonance circuit of the outer coil 12 and the capacitor C3 (resonance circuit 2) are coupled, multi-resonance occurs, and this enables communication over a wide range. Thus, the resonant frequency of the resonance circuit 1 and the resonant frequency of the resonance circuit 2 may preferably be different from one another.

The configuration including the coil antenna 10, the first switch 13, and the capacitors C1, C2, and C3 is an example of the "antenna device".

A capacitor defining a resonance circuit may be connected in parallel or in series with the coil antenna 10 used in the non-contact power transfer system and the inner coil 11 or outer coil 12 used in the communication system.

The electronic apparatus described as a balanced circuit in the present preferred embodiment may be an unbalanced circuit.

Figure 5:
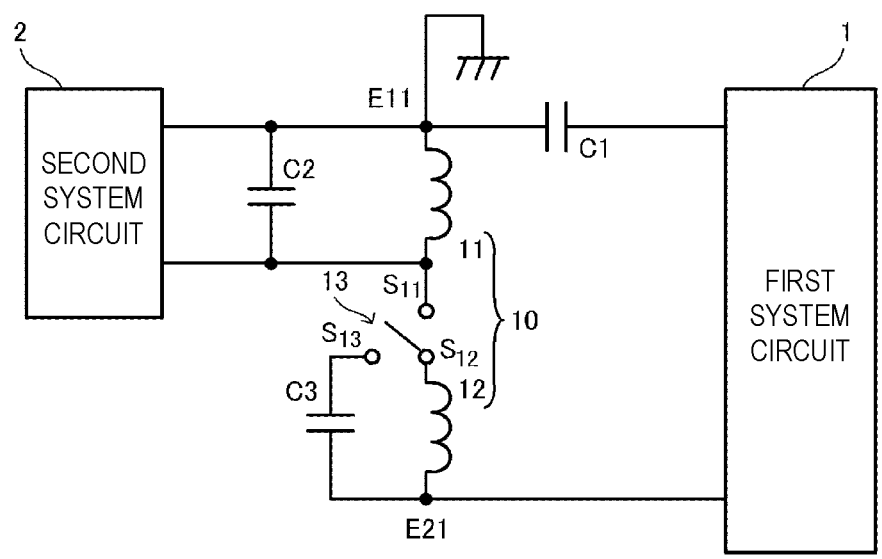
FIG. 5 is an equivalent circuit diagram illustrating a case in which the electronic apparatus is unbalanced.

FIG. 5 is an equivalent circuit diagram illustrating a case in which the electronic apparatus is unbalanced. In this case, the inner end E11 of the inner coil 11 is connected to a ground.

Figure 6A:
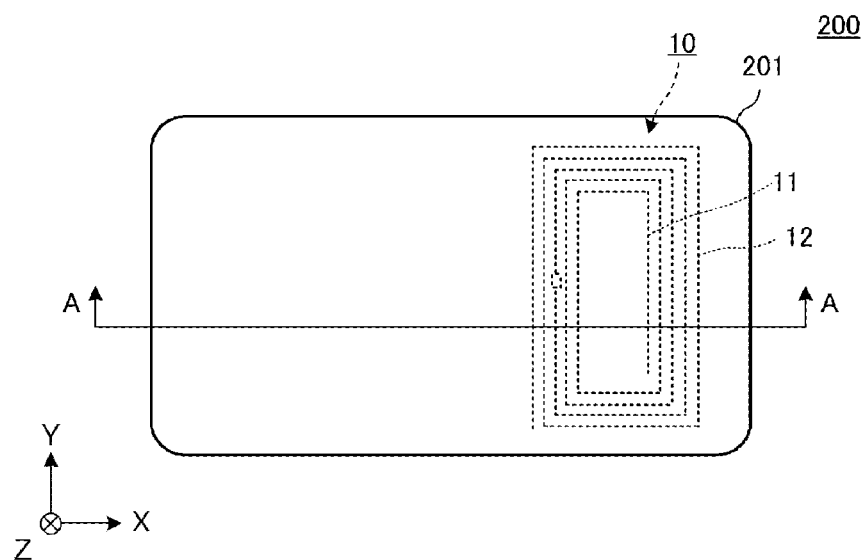
FIG. 6A is a plan view of an electronic apparatus according to a preferred embodiment of the present invention.
Figure 6B:
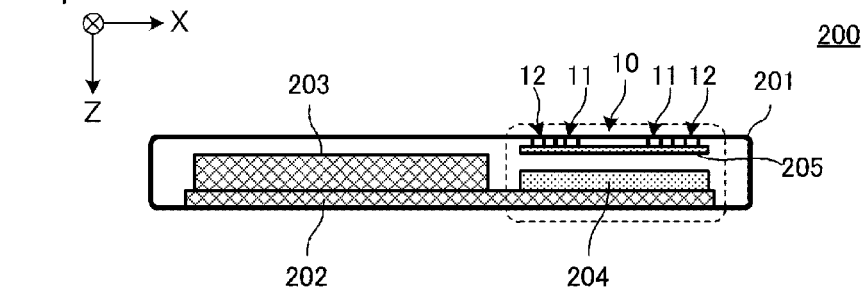
FIG. 6B is a cross-sectional view taken along A-A in FIG. 6A.
Figure 6C:
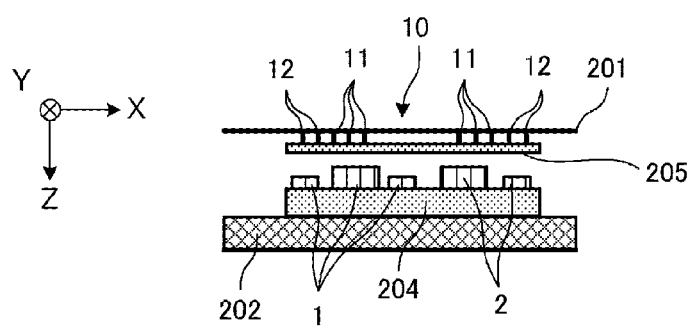
FIG. 6C is an enlarged view of a region surrounded by the broken lines in FIG. 6B.

FIG. 6A is a plan view of an electronic apparatus 200 according to the present preferred embodiment, FIG. 6B is a cross-sectional view taken along A-A in FIG. 6A, and FIG. 6C is an enlarged view of a region surrounded by the broken lines in FIG. 6B.

The electronic apparatus 200 illustrated in FIGS. 6A to 6C includes a casing 201, the coil antenna 10, a display device 202, a battery pack 203, a circuit substrate 204, the first system circuit 1, the second system circuit 2, and other components.

The casing 201 preferably has a parallelepiped shape with a rectangular or substantially rectangular two-dimensional shape, for example. As illustrated in FIG. 6B, the coil antenna 10, display device 202, battery pack 203, circuit substrate 204, first system circuit 1, second system circuit 2, and other components are housed in the casing 201. One example of the casing 201 may be a resin case. One example of the circuit substrate 204 may be a printed wiring board. One example of the display device 202 may be an LCD panel.

The casing 201 includes an upper inner surface to which the coil antenna 10 is attached. The coil antenna 10 further includes a magnetic plate 205. The magnetic plate 205 is disposed over a surface of the coil antenna 10 that is opposite to a surface facing a communication target, that is, is common to the inner coil 11 and outer coil 12. The magnetic plate 205 is preferably a thin plate having a rectangular or substantially rectangular two-dimensional shape, for example. As illustrated in FIG. 6B, the inner coil 11 and outer coil 12 are disposed on a surface of the magnetic plate 205. Examples of the magnetic plate 205 may include a ceramic flat plate, such as a magnetic ferrite ceramic, and a ferrite-powder-containing resin flat plate in which magnetic ferrite powder is dispersed in resin. The two-dimensional shape of the magnetic plate 205 is not limited to a rectangle or a substantial rectangle and may be changed as appropriate.

The display device 202 is disposed in or on the lower surface of the casing 201. The battery pack 203 and the circuit substrate 204 are disposed on the surface of the display device 202. Components, including an IC chip and a capacitor chip, are mounted on the principal surface of the circuit substrate 204, and thus, the first system circuit 1 and second system circuit 2 are provided. The first system circuit 1 is connected to the inner coil 11 with a movable probe pin, a flexible cable, or other suitable connection, for example, (not illustrated) interposed therebetween. The second system circuit 2 is connected to the outer coil 12 with a movable probe pin, a flexible cable, or other suitable connection, for example, (not illustrated) interposed therebetween.

With this configuration, the electronic apparatus including the coil antenna 10 that reduces or prevents the interaction (interference) between the inner coil 11 and outer coil 12 is obtained.

The electronic apparatus described as a portable terminal in the present preferred embodiment may be a stationary apparatus. In this case, the electronic apparatus in a non-contact power transfer system is provided on the power transfer side.

Second Preferred Embodiment

Figure 7:
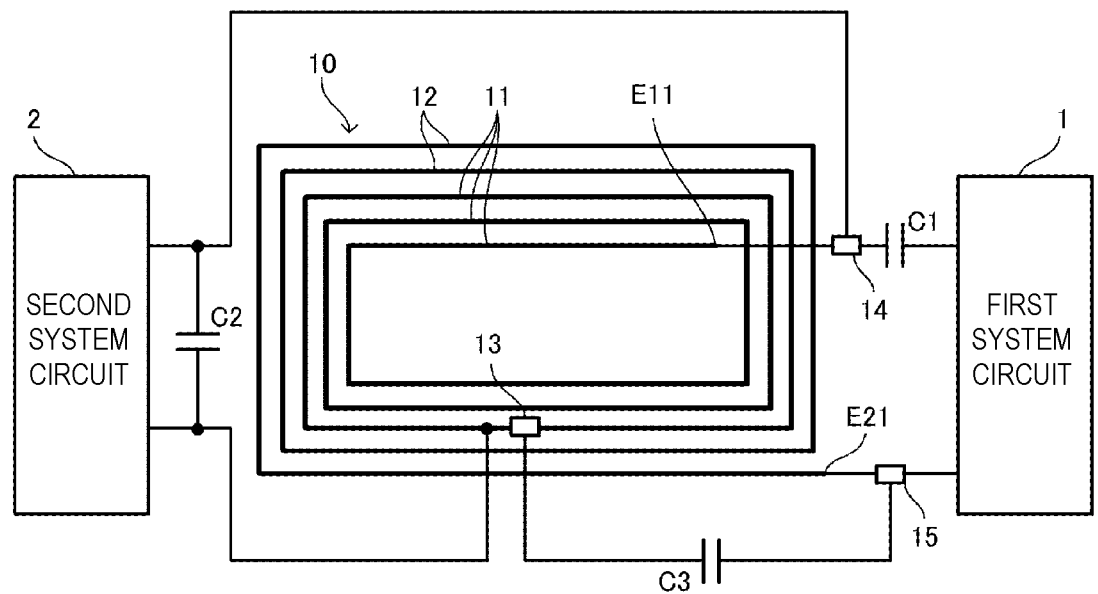
FIG. 7 illustrates a configuration of an electronic apparatus according to a second preferred embodiment of the present invention.
Figure 8:
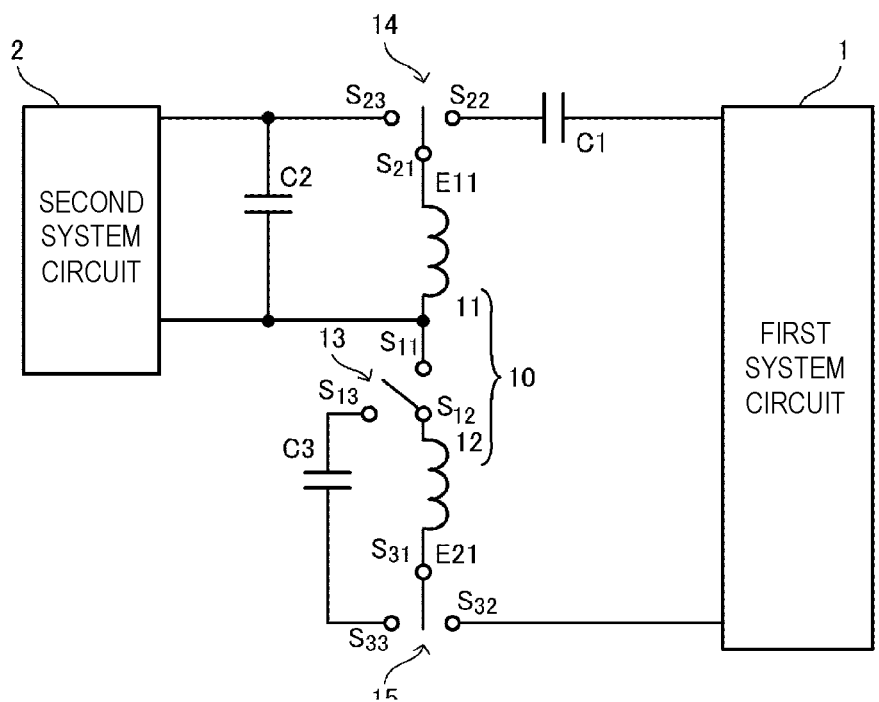
FIG. 8 illustrates an equivalent circuit diagram of FIG. 7.

FIG. 7 illustrates a configuration included in an electronic apparatus according to a second preferred embodiment of the present invention. FIG. 8 illustrates an equivalent circuit diagram of FIG. 7. This example differs from the first preferred embodiment in that it includes a second switch 14 and a third switch 15 disposed between the coil antenna 10 and first system circuit 1.

The second switch 14 is preferably an SPDT switch for connecting a first end $S_{21}$ and a second end $S_{22}$ or a third end $S_{23}$, for example. The second switch 14 is switched by a control circuit (not illustrated). The first end $S_{21}$ is connected to the inner end E11 of the inner coil 11. The second end $S_{22}$ is connected to a first end of input and output ends of the first system circuit 1 with the capacitor C1 interposed therebetween. The third end $S_{23}$ is connected to a first end of input and output ends of the second system circuit 2.

The third switch 15 is preferably an SPDT switch to connect a first end $S_{31}$ and a second end $S_{32}$ or a third end $S_{33}$, for example. The third switch 15 is switched by a control circuit (not illustrated). The first end $S_{31}$ is connected to the inner end E21 of the outer coil 12. The second end $S_{32}$ is connected to a second end of the input and output ends of the first system circuit 1. The third end $S_{33}$ is connected to the third end $S_{13}$ of the first switch 13 with the capacitor C3 interposed therebetween.

Figure 9:
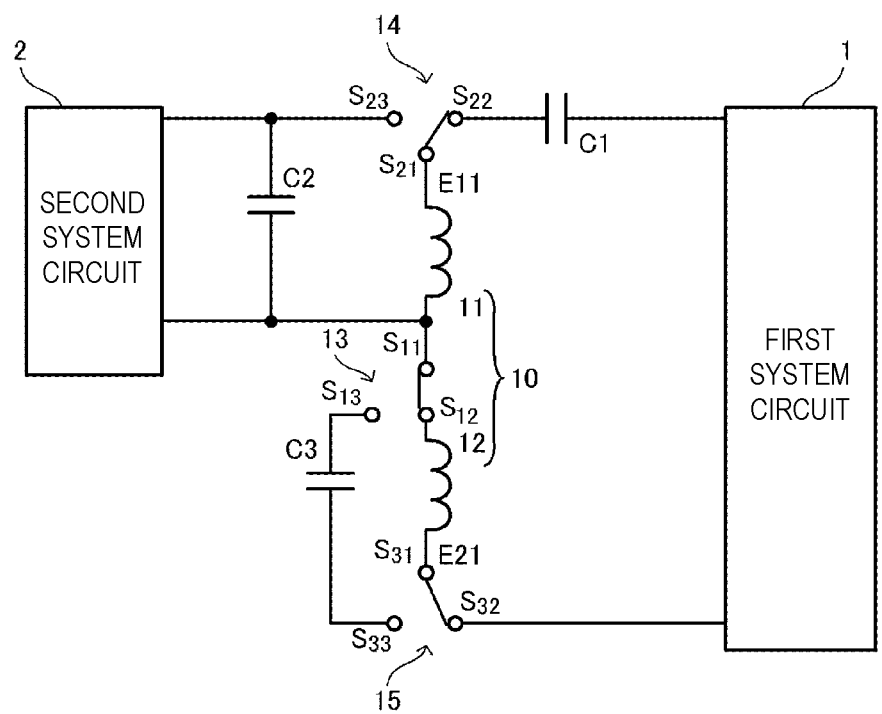
FIG. 9 is a circuit diagram illustrating a state in which an inner coil and an outer coil are connected to each other.

FIG. 9 is a circuit diagram illustrating a state in which the inner coil 11 and outer coil 12 are connected to each other.

In this example, the first switch 13 connects the first end $S_{11}$ and second end $S_{12}$. The second switch 14 connects the first end $S_{21}$ and second end $S_{22}$. The third switch 15 connects the first end $S_{31}$ and second end $S_{32}$. In this case, when the coil antenna 10 is used as an antenna of a magnetic-field non-contact power transfer system, the magnetic-field non-contact power transfer system circuit and a communication system circuit are able to be separated by the action of the second switch 14. Accordingly, power is able to be transferred in a magnetic-field non-contact manner without being affected by the communication system circuit.

Figure 10:
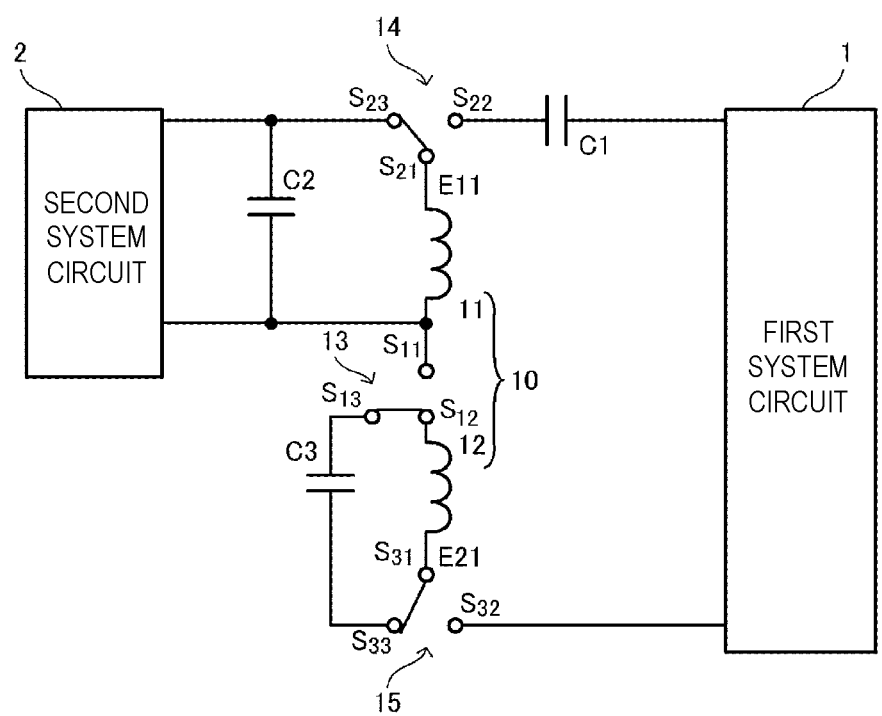
FIG. 10 is a circuit diagram illustrating a state in which the inner coil and the outer coil are separated.

FIG. 10 is a circuit diagram illustrating a state in which the inner coil 11 and outer coil 12 are separated.

In this example, the first switch 13 connects the second end $S_{12}$ and third end $S_{13}$. The second switch 14 connects the first end $S_{21}$ and third end $S_{23}$. The third switch 15 connects the first end $S_{31}$ and third end $S_{33}$. In this case, when the inner coil 11 is used as an antenna in a communication system and the outer coil 12 is used as a resonance booster antenna, the magnetic-field non-contact power transfer system circuit and the communication system circuit are able to be separated from each other by the action of the second switch 14 and third switch 15. Accordingly, magnetic-field coupling communication is able to be performed without being affected by the magnetic-field non-contact power transfer system circuit.

In some preferred embodiments described above, examples of the coil antenna 10 including the coil 11 on the inner side and the coil 12 on the outer side are illustrated. The coil antenna 10 may preferably have a two-layer structure including the coils 11 and 12 having the same or substantially the same diameters, for example. In such a configuration, the area occupied by the coil antenna 10 is able to be reduced, and mounting of the coil antenna 10 on the electronic apparatus is facilitated.

In some preferred embodiments described above, examples of the antenna device connected to two systems including the first system circuit and second system circuit are illustrated. The antenna device may be connected to three or more system circuits. In this case, an antenna device capable of, in addition to switching in a two-stage manner for the two systems, switching in a multistage manner for multiple systems is provided. In such a configuration, when at least two of the system circuits correspond to the first system circuit and second system circuit according to a preferred embodiment of the present invention and a coil antenna connected thereto includes a portion corresponding to a first coil portion and a second coil portion according to a preferred embodiment of the present invention, the operational advantages of preferred embodiments of the present invention are able to be obtained.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
   a coil conductor shared by a first non-contact transfer system and a second non-contact transfer system; and
   a second capacitor; wherein
   the coil conductor includes a first coil portion and a second coil portion connected in series with each other;
   the coil conductor includes opposite ends connected to a first non-contact transfer system circuit;
   the first coil portion includes opposite ends connected to a second non-contact transfer system circuit;
   the second coil portion is coupled to the first coil portion by at least a magnetic field; and
   the second capacitor defines a resonance circuit together with the second coil portion.

2. The antenna device according to claim 1, further comprising:
   a first capacitor defining a resonance circuit together with the first coil portion; and
   a third capacitor defining a resonance circuit together with the first coil portion and the second coil portion.

3. The antenna device according to claim 1, wherein
   the first coil portion is on an inner side of the coil conductor; and
   the second coil portion is on an outer side of the coil conductor.

4. The antenna device according to claim 1, wherein the first coil portion and the second coil portion are connected in series with each other with a first switch interposed therebetween.

5. The antenna device according to claim 4, further comprising:
   a second switch to selectively connect the first coil portion to the first non-contact transfer system circuit or the second non-contact transfer system circuit; and
   a third switch to selectively connect the second coil portion to the first non-contact transfer system circuit or a capacitor.

6. The antenna device according to claim 1, wherein a carrier frequency of the first non-contact transfer system is lower than a carrier frequency of the second non-contact transfer system.

7. The antenna device according to claim 6, wherein the first non-contact transfer system is a magnetic-field non-contact power transfer system, and the second non-contact transfer system is a magnetic-field non-contact communication system.

8. The antenna device according to claim 1, wherein the coil conductor has a rectangular or substantially rectangular spiral shape.

9. The antenna device according to claim 1, wherein the coil conductor has a single-layer spiral structure.

10. The antenna device according to claim 1, further comprising a magnetic plate on which the coil conductor is disposed.

11. An electronic apparatus comprising:
an antenna device including a coil conductor;
a first non-contact transfer system circuit connected to the antenna device;
a second non-contact transfer system circuit connected to the antenna device; and
a second capacitor; wherein
the coil conductor includes a first coil portion and a second coil portion connected in series with each other;
the coil conductor includes opposite ends connected to the first non-contact transfer system circuit;
the first coil portion includes opposite ends connected to the second non-contact transfer system circuit;
the second coil portion is coupled to the first coil portion by at least a magnetic field; and
the second capacitor defines a resonance circuit together with the second coil portion.

12. The electronic apparatus according to claim 11, further comprising:
a first capacitor defining a resonance circuit together with the first coil portion; and
a third capacitor defining a resonance circuit together with the first coil portion and the second coil portion.

13. The electronic apparatus according to claim 11, wherein
the first coil portion is on an inner side of the coil conductor; and
the second coil portion is on an outer side of the coil conductor.

14. The electronic apparatus according to claim 11, wherein the first coil portion and the second coil portion are connected in series with each other with a first switch interposed therebetween.

15. The electronic apparatus according to claim 14, further comprising:
a second switch to selectively connect the first coil portion to the first non-contact transfer system circuit or the second non-contact transfer system circuit; and
a third switch to selectively connect the second coil portion to the first non-contact transfer system circuit or a capacitor.

16. The electronic apparatus according to claim 11, wherein a carrier frequency of the first non-contact transfer system is lower than a carrier frequency of the second non-contact transfer system.

17. The electronic apparatus according to claim 16, wherein the first non-contact transfer system is a magnetic-field non-contact power transfer system, and the second non-contact transfer system is a magnetic-field non-contact communication system.

18. The electronic apparatus according to claim 11, wherein the coil conductor has a rectangular or substantially rectangular spiral shape.

19. The electronic apparatus according to claim 11, wherein the coil conductor has a single-layer spiral structure.

20. The electronic apparatus according to claim 11, further comprising a magnetic plate on which the coil conductor is disposed.

21. An antenna device comprising:
a coil conductor shared by a first non-contact transfer system and a second non-contact transfer system; and
a magnetic plate on which the coil conductor is disposed; wherein
the coil conductor includes a first coil portion and a second coil portion connected in series with each other;
the coil conductor includes opposite ends connected to a first non-contact transfer system circuit;
the first coil portion includes opposite ends connected to a second non-contact transfer system circuit; and
the second coil portion is coupled to the first coil portion by at least a magnetic field.

* * * * *